July 31, 1923.
J. R. GRAYSON
1,463,690
AUTOMATIC WHEELED SCRAPER
Filed April 6, 1922   3 Sheets-Sheet 1
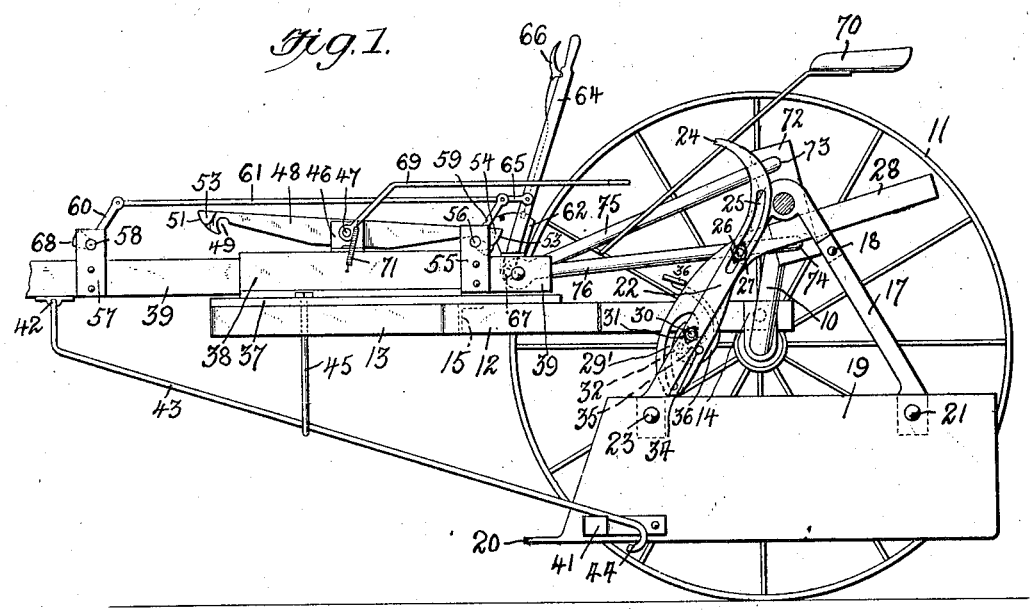
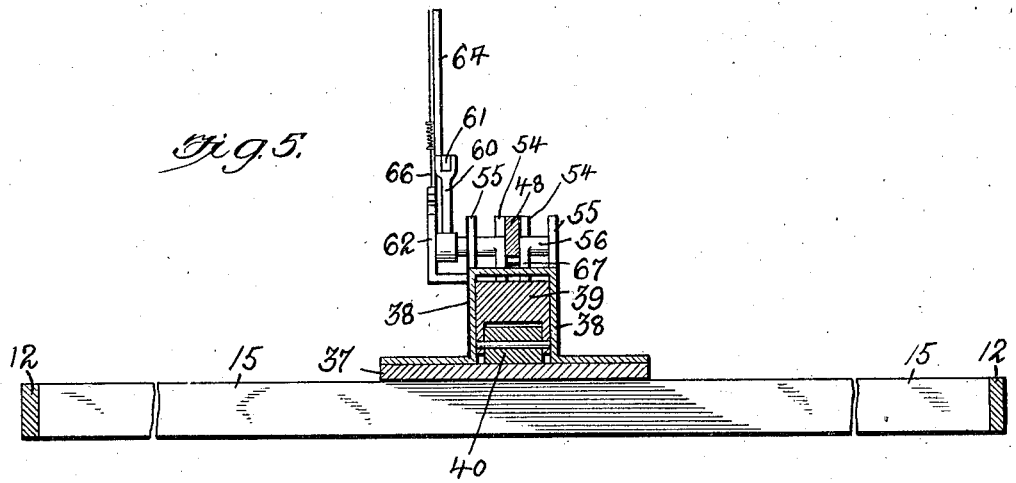
J. R. Grayson, INVENTOR.
BY Geo. P. Kimmel, ATTORNEY.

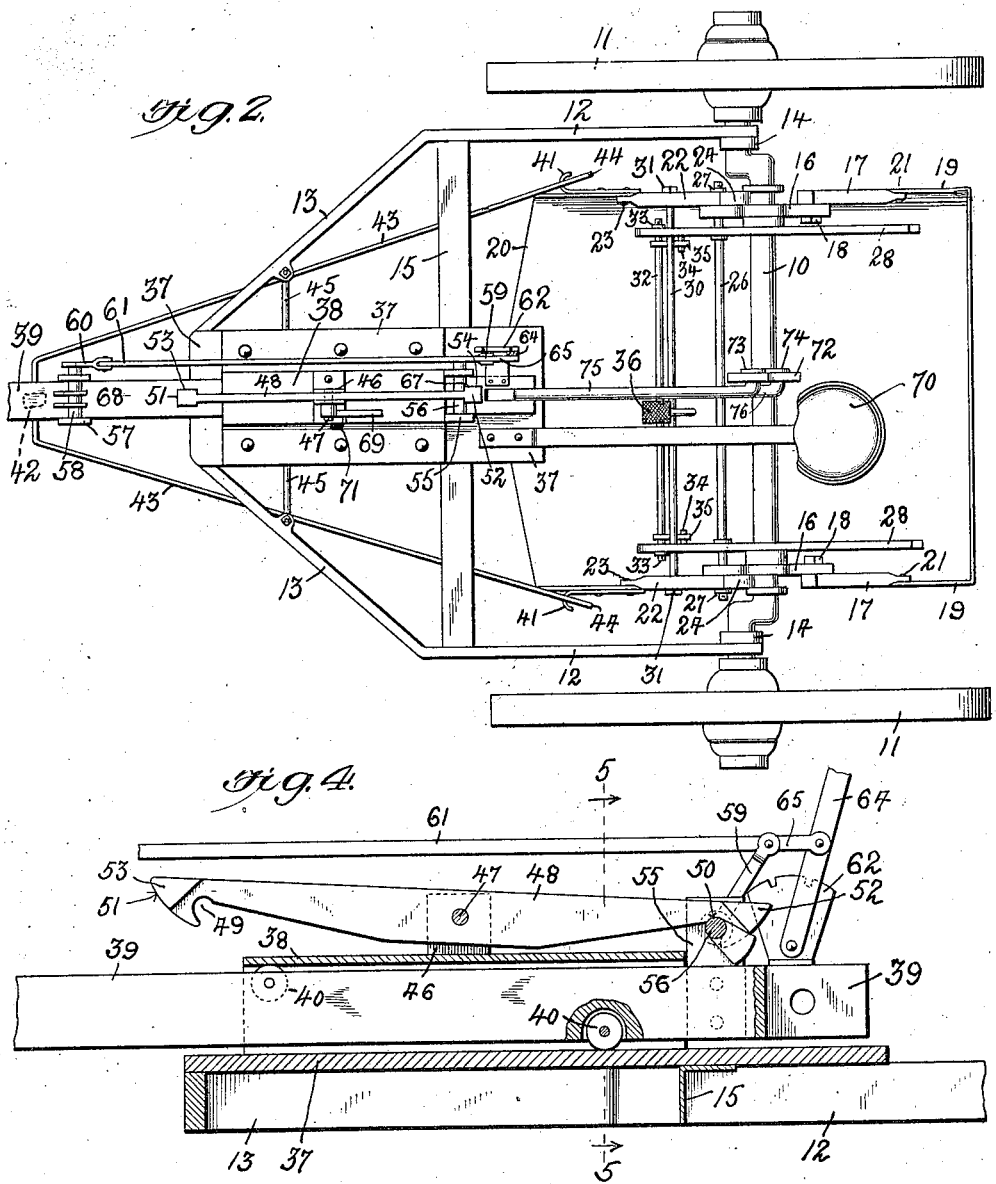

July 31, 1923.
J. R. GRAYSON
1,463,690
AUTOMATIC WHEELED SCRAPER
Filed April 6, 1922
3 Sheets-Sheet 3
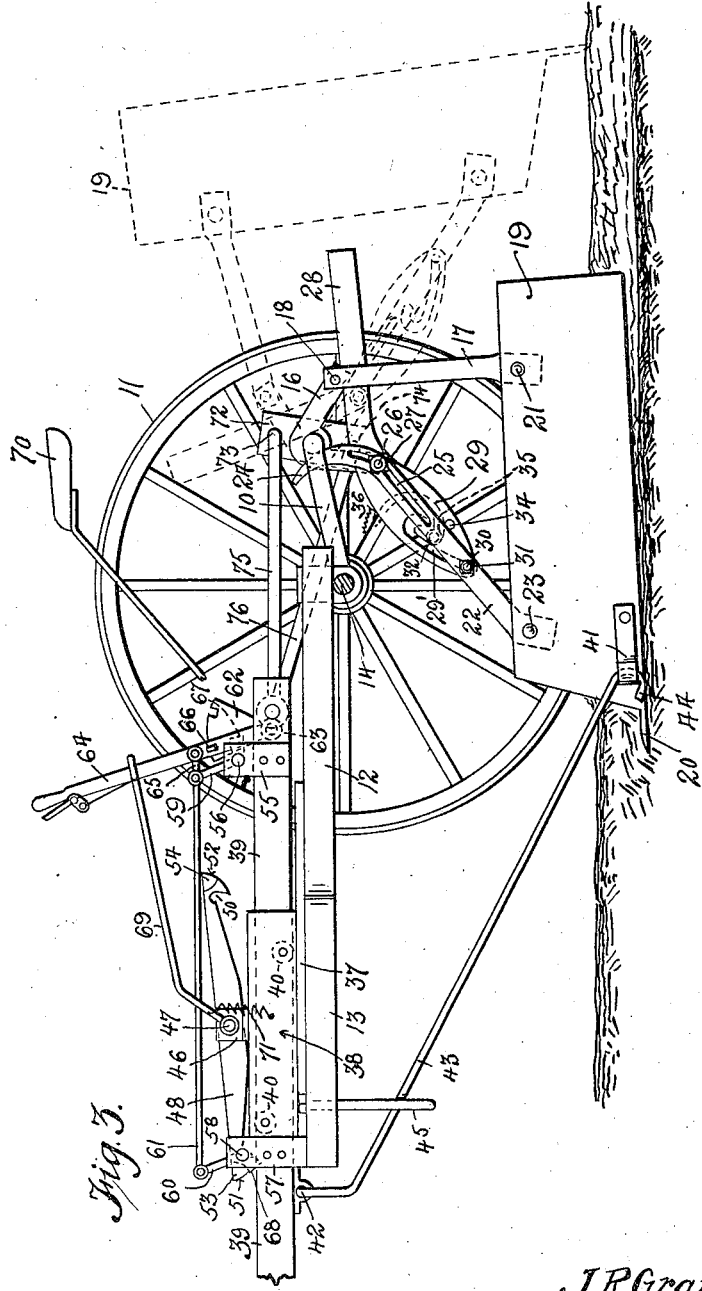
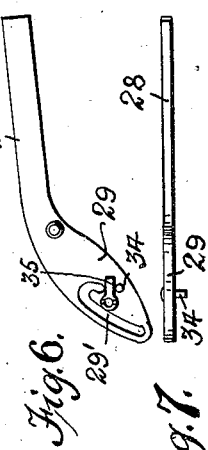
J. R. Grayson, INVENTOR.
BY Geo. P. Kimmel, ATTORNEY.

Patented July 31, 1923.

1,463,690

UNITED STATES PATENT OFFICE.

JOHN ROBERT GRAYSON, OF KAKABEKA FALLS, ONTARIO, CANADA.

AUTOMATIC WHEELED SCRAPER.

Application filed April 6, 1922. Serial No. 550,175.

*To all whom it may concern:*

Be it known that I, JOHN ROBERT GRAYSON, a subject of the King of England, residing at Kakabeka Falls, in the district of Thunder Bay, in the Province of Ontario and Dominion of Canada, have invented certain new and useful Improvements in Automatic Wheeled Scrapers, of which the following is a specification.

This invention relates to wheel scrapers of the class wherein all the various movements to accomplish the loading, transporting, dumping, and restoring the scraper pan to operative position, are under the control of the driver on his seat, and has for one of its objects to improve the construction and increase the efficiency of devices of this character.

With these and other objects in view the invention consists in certain novel features of construction as hereinafter shown and described and then specifically pointed out in the claims, and in the drawings illustrative of the preferred embodiment of the invention:—

Figure 1 is a side elevation of the improved apparatus with the operating parts arranged to hold the receiving pan in load transporting position, with the nigh bearing wheel removed and the arched axle in transverse section.

Fig. 2 is a plan view with the parts arranged as in Fig. 1.

Fig. 3 is a view similar to Fig. 1, with the operating parts arranged to hold the receiving pan in excavating position.

Fig. 4 is an enlarged detail view illustrating the construction and operation of the supports for the slidable tongue and mechanism actuated thereby.

Fig. 5 is an enlarged transverse section on the line 5—5 of Fig. 4, looking in the direction of the arrow.

Fig. 6 is an enlarged detached side view of the cam lever.

Fig. 7 is an edge view of the member shown in Fig. 6.

The improved device includes an arched axle 10 and bearing wheels 11. A supporting frame comprises side portions 12 and connecting forwardly converging portions 13 is swingingly coupled to the axles near the journals for the wheels 11 by plates 14.

The portions 12 of the frame are reinforced by a transverse brace or strut 15, preferably formed from an L-bar as shown in Fig. 4.

Mounted rotatably upon the arched portion of the axle 10 are inverted V-shaped hanger devices 16, having link members 17 pivoted respectively at 18 to hold the rear portion of the scraper, as hereafter explained.

The combined "scoop" and carrying bucket is represented as a whole at 19 and includes a cutting or earth penetrating front edge 20, preferably in flat V-shape as shown in Fig. 2.

The link members 17 are pivoted at 21 to the sides of the bucket near its rear end, while other link members 22 are pivoted at 23 to the opposite sides of the bucket. The link members 22 are curved as shown at 24 at their free ends and each provided with a longitudinally directed slot 25. A tie rod 26 extends through the slots 25 and likewise through the links 22 and the other leg of the hanger device 16 and is provided with binding nuts 27 bearing respectively against the outer faces of the hanger device as shown. The rod 26 thus serves as a binder element to hold the links 22 and hangers in coupled relation, but also as an elongated pivot on which the links and hangers swing.

Mounted to swing intermediate the ends upon the combined tie and pivot rod 26 are arms 28 enlarged at 29 at one end, and with U-shaped slots 29' through the enlarged portions, the "legs" of the slots being of unequal length, as shown more particularly in Fig. 6 which represents one of these arms enlarged and detached. Another tie rod 30 extends through the links 22 between the slots 25 and the pivoted ends 23, and is provided with binding nuts 31 bearing against the outer faces of the links.

Extending through the enlarged portions of the arms 28 adjacent to the slot 29' is a third tie rod 32 with binding nuts 33 bearing against the outer faces of the arms.

Projecting from the confronting faces of the arms 28 adjacent to the tie rod 32, are pins 34, and attached to the rod 32 are trip fingers 35 which extend respectively between the tie rod 30 and the pins 34.

Attached to the tie rod 32 is a foot lever 36 which operates to rotate the rod 32 and cause the finger 35 to transfer the rod 30 from the shorter to the longer portion of the slot 29, as hereafter explained.

Mounted upon the frame members 12 and 13 is a base plate 37, and mounted upon the base plate is a housing 38 for a draft tongue 39, the latter being slidable through the housing. Anti-friction rollers 40 are arranged within seats within the tongue 39 to reduce the friction between the tongue and the housing 38 and plate 37.

Attached to the sides of the bucket 19 are rearwardly opening hooks 41, and swinging at 42 from the lower part of the tongue 39 are rearwardly diverging rods 43 having terminal hooks 44 engaging the hooks 41 when the bucket is in one position.

A supporting yoke device 45 depends from the frame members 13, to support the rod portions 43 and prevent them from dragging on the ground when not in use as shown in Fig. 3.

Rising from the housing 38 intermediate the ends are ears 46, and pivoted at 47, between the ears is a latch bar 48 having downwardly and inwardly opening hooks 49 and 50 at the ends and inclined terminals 51 and 52 in advance of the hooks, and with lateral projections 53 and 54 at the inclined terminals.

Attached to tongue 39 near its rear end are other ears 55 through which a rock shaft 56 is journaled, while similar ears 57 are attached to the tongue 39 in advance of the housing and support a similar short rock shaft 58.

Connected respectively to the rock shafts 56 and 58 are lever arms 59 and 60, the latter being coupled by an operating rod 61.

Attached to the tongue 39 near its rear end is a notched segment 62, and pivoted at 63 to the segment is a lever 64, the latter coupled to the lever arm 59 by a link 65. The lever 64 is provided with a suitable pawl device of the usual construction and indicated at 66 and adapted to engage the teeth of the segment and hold the lever and the parts associated therewith in adjusted position.

Depending respectively from the rock shafts 56 and 58, are trip lugs 67 and 68 operative on opposite sides of the member 48 and against the lateral projections 53 and 54, to swing the latch bar 48 upon its pivot 47, and thus release the hooks 49 from engagement with the rock shafts 56 and 58, when the shipper lever 64 is actuated.

Thus when the tongue 39 is in its forward position and the lever 64 likewise in its forward position as shown in Figs. 1, 2 and 4, the hook 50 of the latch bar 48 will be engaged with the rear rock shaft 56 and the hook 49 disengaged from the forward rock shaft 58, and then when the tongue 29 is in its rearward position and the lever 64 in its forward position, as shown in Fig. 3, the hook 49 of the latch bar will engage the forward rock shaft 58 while the hook 50 will be disconnected from the rear rock shaft 56. The latch bar 48 is rigidly connected to its pivot 47, and rigidly coupled to the pivot externally of one of the ears 46 is a manually operative lever arm 69 extending rearwardly and in convenient position for the driver on the seat, the latter indicated at 70.

A spring 71 is attached to the lever 69 to maintain the same in depressed position with the latch bar 48 also yieldably in engagement with the rear rock shaft 56.

Mounted for rotation on the arched portion of the axle 10 is a plate 72 and pivotally connected at 73 and 74 to the plate are relatively heavy links 75 and 76.

When the bucket 19 is to be disposed in operative or excavating position, as shown in Fig. 3, in full lines, the shipper lever 64 is disposed in its forward position to release the rocking arm 48 from engagement with the rock shaft 56, and the team or other tractive force moved rearwardly which carry the tongue rearwardly into the position shown in Fig. 3, with the ends 57 bearing against the forward end of the housing 38 and the hook 49 in engagement with the forward rock shaft 58.

Where the tractor device is employed as an operative force, it may be of greater advantage to move the excavator apparatus forwardly, or toward the tractor; but when draft animals are employed as a pulling force, it may be more advantageous to back the team toward the excavator apparatus. In either event the backward movement of the tongue will cause the links 75 and 76 to swing the arched portion of the axle 10 into its rearward or lower position, as shown in Fig. 3.

Assuming that the rod 30 is engaged in the shorter arm of the slot 29', the operator depresses the foot lever 36 and thus causes the arm 34 to transfer the rod 30 to the longer leg of the slot and thus release the "nose" of the bucket and cause the latter to drop into earth engaging position, as shown in Fig. 3, the pull rods 43 thereafter holding the "nose" to its work, while the backward pressure causes the curved portions 24 of the links 22 to engage the arched portion of the axle and limit the rearward movement.

When the bucket is filled or provided with its "load" the operator draws the lever 64 rearwardly to cause the trip lugs 68 to engage the lateral projections 53 and elevate the adjacent end of the rock lever 48, and thus release the tongue 39 and permit it to be drawn forwardly through the housing 38 and cause the links 75 and 86 to draw the arched portion of the axle 10 into its upper position as in Fig. 1, and thus elevate the bucket, the operator at the same time actuating the member 28 and restoring the rod 30 to its seat in the shorter leg of the slot 29'. This will elevate the nose of the bucket and hold the latter in substantially horizontal position ready to be conveyed to a place where the load is to be dumped. When this point is reached, the operator disconnects the pull rods 43, when the nose 20 of the bucket will drop to the ground and the pulling force of the tongue continues, the bucket will be drawn into the position shown by dotted lines in Fig. 3 and dump the load.

When the load has been dumped the operator restores the bucket to load carrying position and returns it to the excavating position and the operation repeated.

The apparatus can be manufactured in any size and capacity and can be employed wherever a combined scraper and excavator is required.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In a wheeled scraper, a supporting frame, an upwardly arching axle mounted on said frame and having carrier wheels, a draft tongue slidable relative to said frame, couping means between said draft tongue and the arching portion of said axle, means for holding said draft tongue in its forward and rearward positions, an excavating bucket, means for suspending said bucket from said axle portion, whereby when the draft tongue is in its rearward position the bucket will be disposed in excavating position and when the draft tongue is in its forward position the bucket will be disposed in load transporting position.

2. In a wheeled scraper, a supporting frame, an upwardly arching axle mounted on said frame and having carrier wheels, a draft tongue slidable relative to said frame, coupling means between said draft tongue and the arching portion of said axle, rock shafts carried by said tongue in spaced relation, a rocker arm supported relative to said frame and having terminal hooks adapted to be alternately engaged with said rock shaft to hold the tongue in its forward and rearward positions, an excavating bucket, means for suspending said bucket from said axle arching portion, and means for actuating said rocker arm to alternately engage the terminal hooks with the rock shaft and hold the tongue in its forward and rearward positions.

3. In a wheeled scraper, a supporting frame, an upwardly arching axle mounted on said frame and having carrier wheels, a housing carried by said frame, a drive tongue slidable through said housing, coupling means between said draft tongue and the arching portion of said axle, rock shafts carried by said tongue in spaced relation, a rocker arm supported relatively to said frame and having terminal hooks adapted to be alternately engaged with said rock shafts to hold the tongue in its forward and rearward positions, an excavating bucket, means for suspending said bucket from said axle arching portion, and means for actuating said rocker arms to alternately engage the terminal hooks with the rock shaft and hold the tongue in its forward and rearward positions.

4. In a wheeled scraper, a supporting frame, an upwardly arching axle mounted on said frame and having carrier wheels, a draft tongue slidable relative to the said frame, coupling means between said draft tongue and the arching portion of said axle, bell crank members including rearwardly and forwardly directed legs swinging upon said axle arching portion, an excavating bucket, rear suspension links pivoted respectively to said bucket near its rear end and to the rear legs of said bell crank member, forward suspension links pivoted at one end to the bucket at its forward end and having longitudinally directed slots, a pivot extending through the forward leg of the bell crank member and the slot of the forward legs of the bell crank members, a lever arm pivoted intermediate its ends to the pivot of the forward arm of the bell crank member and provided with an inverted U-shaped slot, a rod connected at its ends in said forward links and extending through the slots of the lever arms, pull rods connected to said supporting frame and detachably coupled to said bucket, means for holding said draft tongue in its forward and rearward positions, and means under the control of the operator to transfer the rod from the shorter to the longer arm of the slot.

5. In a wheeled scraper, a supporting frame, an upwardly arching axle mounted on said frame and having carrier wheels, a draft tongue slidable relative to said frame, coupling means between said draft tongue and the arching portion of said axle, bell crank members including rearward and forwardly directed legs swinging upon said axle arching portion, an excavating bucket, rear suspension links pivoted respective to said bucket near its rear end and to the rear legs of said bell crank members, forward suspension links pivoted at one end to the bucket at its forward end and having a longitudinally directed slot and with its upper portion curved and adapted to engage the arched portion of the axle when the bucket is in operative and load transporting position, a pivot extending through the forward leg of the bell crank member and the slot of the forward legs of the bell crank members, a lever arm pivoted intermediate its ends to the pivot of the forward arm of the bell crank members and provided with an inverted U-shaped slot, a rod connected at its ends in said forward links and extending through the slots of the lever arms, pull rods connected to said supporting frame and detachably coupled to said bucket, means for holding said draft tongue in its forward and rearward positions, and means under the control of the operator to transfer the rod from the shorter to the longer arm of the slot.

In testimony whereof, I affix my signature hereto.

JOHN ROBERT GRAYSON.